Patented May 25, 1937

2,081,284

UNITED STATES PATENT OFFICE 2,081,284

TERTIARY ALKYL PHENOLS

Frits E. Stockelbach, Montclair, N. J., assignor to Harold H. Fries, doing business as Fries Bros., New York, N. Y.

No Drawing. Application June 10, 1932,
Serial No. 616,493

5 Claims. (Cl. 260—154)

The present invention relates to compounds suitable for use as antiseptics, disinfectants, germicides and the like and more especially it relates to such substances that are obtainable by the reaction of a phenolic compound with a tertiary alcohol, and constitutes a continuation, in part, of my application, Serial No. 572,219, filed October 30, 1931.

In my aforementioned application I have disclosed that the introduction of a tertiary alkyl radical into meta cresol increases the germicidal value of said phenol many fold.

I have now carried by investigations further and have determined the effect of the introduction of the tertitary alcohol radical into the nucleus of the various phenols present in coal tar and find that in all instances examined that the germicidal value of the teritary alkyl substituted phenols is materially greater than the germicidal value of the corresponding phenols prior to the introduction thereinto of the tertiary alkyl radical. The phenolic compounds which I have investigated are the following:

|  | Degrees centigrade |
|---|---|
| Phenol _____ melting point __ | 39 |
| Cresol U. S. P. _____ boiling range __ | 196–202 |
| Cresylic acid—crude ____ boiling range __ | 201–216 |
| Cresylic acid—crude ____ boiling range __ | 203–225 |
| Xylenol _____ boiling range __ | 212–222 |

All of the foregoing phenolic compounds are commercially available products from the refining of coal and gas tar.

The method of preparing the tertiary alcohol substitution products is best carried out through the condensation of the corresponding tertiary alcohol with the phenolic compound, using a suitable condensing agent, such, for example, zinc chloride. In carrying out the condensation reaction, the phenolic compound, the tertiary alcohol and zinc chloride are heated with constant stirring until the reaction is complete, which requires two or three hours. The reaction products consist of mixtures of mono and di-substituted tertiary alkyl phenols, and they are purified after careful washing by fractional distillation in vacuum.

Examples of the products obtained from the five phenols aforementioned wherein tertiary butyl alcohol is employed as the tertiary alkyl producing radical, are given below with their physical constants:

*Tertiary butyl phenol*

Crystalline compound; congealing point 76° C.

*Tertiary butylated cresol U. S. P.*

| Spec. gravity | .9662 at 20° C. |
|---|---|
| Optical rotation | +.2° at 25° C. |
| Refractive index 20° C | 1.5207 |
| Boiling range 760 mm | 240–253° C. |

*Tertiary butylated cresylic acid crude*

| Spec. gravity at 20° | .9673 |
|---|---|
| Optical rotation 25° | +.1° |
| Refractive index 20° C | 1.5217 |
| Boiling range 760 mm | 237–257° C. |

*Tertiary butylated cresylic acid crude*

| Spec. gravity at 20° | .9691 |
|---|---|
| Optical rotation: 25° | +.1 |
| Refractive index 20° | 1.5220 |
| Boiling range 760 mm | 238–259° C. |

*Butylated xylenol*

| Specific gravity 20 | .9613 |
|---|---|
| Optical rotation | +.1 |
| Refractive index 20 | 1.5205 |
| Boiling range 760 mm | 250–265° C. |

The phenol substitute is a para compound. As cresol U. S. P. and crude cresylic acid consist of mixtures of ortho, meta and para cresols and as the xylenol also contains various isomers, the position of the tertiary alkyl radical in these alkyl substituted phenols is not determinable.

Bacteriological tests of the original phenols and of the tertiary butyl substitutes are shown in the following table, the phenol coefficients having been determined according to the Food and Drug Administration Method as published in the United States Department of Agriculture Circular No. 198 using staphylococcus as testing organism:

|  | Phenol coefficient |
|---|---|
| Phenol U. S. P. | 1. |
| Tertiary Butyl Phenol | 87.5 |
| Cresol U. S. P. | 3.1 |
| Tertiary butylated cresol U. S. P. | 75.0 |
| Cresylic acid (boiling range 201–216) | 3.7 |
| Tertiary butylated cresylic acid (boiling range 201–216) | 87.5 |
| Cresylic acid (boiling range 203–225) | 5.0 |
| Tertiary butylated cresylic acid (boiling range 203–225) | 100.0 |
| Xylenol | 5.6 |
| Tertiary butylated xylenol | 150.0 |

Tertiary amyl alcohol may be used in a way similar to tertiary butyl alcohol in obtaining antiseptics and germicides of the class described. The condensation products obtained with tertiary amyl alcohol, however, do not have as high a phenol coefficient as the corresponding phenol condensation products with tertiary butyl alcohol.

From the foregoing detailed description it will be appreciated that I have discovered a new class of powerful antiseptics and germicides, and it is not intended that any one particular compound produced in any of these condensation reactions shall be isolated for use but that a certain fraction or fractions boiling over a fairly wide temperature range shall be taken for such use. In cases, however, where the condensation product consists mainly of one compound which may be easily brought to a high degree of purity by fractional distillation, such particular compound may be isolated. Hence the invention is not to be considered as limited to the specific compounds and condensation products enumerated, but is applicable to antiseptics and germicides comprising as a constituent thereof the condensation products of a phenolic compound and a tertiary alcohol, and more particularly to the condensation products of commercial phenols, for example, those derived from coal tar and tertiary butyl alcohol.

What I claim is:

1. The nuclear alkylated condensation products of a mixture of commercial phenols derived from coal tar and a tertiary alcohol.

2. The nuclear alkylated condensation products of a mixture of commercial phenols derived from coal tar and tertiary butyl alcohol.

3. The condensation product of cresol U. S. P. having a boiling range from 196°–202° C. with tertiary butyl alcohol, the said condensation product having a boiling range of 240°–253° C.

4. The condensation product of crude cresylic acid having a boiling range from 201°–216° C. with tertiary butyl alcohol, the said condensation product having a boiling range of 237°–257° C.

5. The condensation product of xylenol having a boiling range from 212°–230° C. with tertiary butyl alcohol, the said condensation product having a boiling range of 250°–265° C.

FRITS E. STOCKELBACH.